J. R. WOOD.
CALK ATTACHMENT FOR HORSESHOES.
APPLICATION FILED FEB. 7, 1913.
1,153,664.
Patented Sept. 14, 1915.
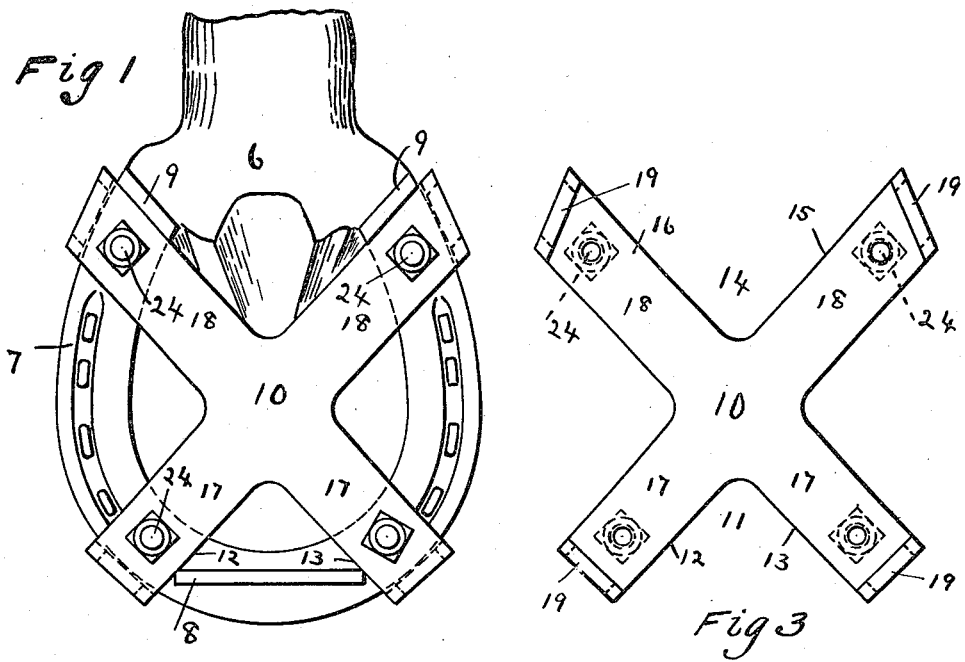
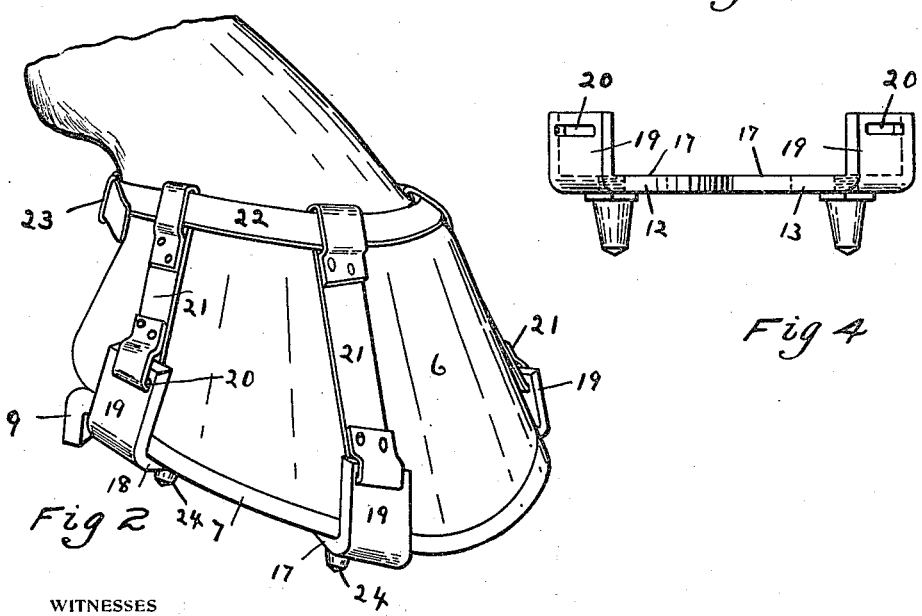
WITNESSES
John Gargan
Harriet Williams
INVENTOR
John R. Wood
BY Martin & Jones
ATTORNEYS

UNITED STATES PATENT OFFICE.

JOHN R. WOOD, OF HERKIMER, NEW YORK.

CALK ATTACHMENT FOR HORSESHOES.

1,153,664. Specification of Letters Patent. Patented Sept. 14, 1915.

Application filed February 7, 1913. Serial No. 746,728.

*To all whom it may concern:*

Be it known that I, JOHN R. WOOD, of Herkimer, in the county of Herkimer and State of New York, have invented certain new and useful Improvements in Calk Attachments for Horseshoes; and I do hereby declare that the following is a full, clear, and exact description thereof, which will enable others skilled in the art to which it appertains to make and use the same, reference being had to the accompanying drawings, and to the reference-numerals marked thereon, which form part of this specification.

The purpose of my invention is to provide an improved calk attachment for horseshoes.

One object is to provide a device of this character which is simple, strong and economical in construction, easily applied or removed without tools and safe, efficient and durable in use.

Another object is to have such an attachment as can be readily fitted to the ordinary horseshoe without changing the attachment or the permanent horseshoe.

A still further object is to furnish such a device as will transfer the working strains directly through its rigid frame to the permanent horseshoe without bringing any strain upon its flexible connections such as straps or chains that hold the calk frame to the permanent shoe.

Figure 1 is a plan view of a calk attachment for horseshoes embodying my device as applied to an ordinary horseshoe upon the hoof and as viewed from beneath. Fig. 2 is a side perspective view of the same. Fig. 3 is a top plan view of the frame of the attachment and Fig. 4 is a front elevation thereof.

Referring more particularly to the drawing, there is shown in Figs. 1 and 2 a horse's hoof 6 shod with a horseshoe 7 of the ordinary and usual type having a flat U-shaped body to the lower side of which near its front is rigidly secured or formed integral therewith, the usual downward projecting front calk 8 while the ends of the U are turned down to form the usual rear calks 9. To the horse's hoof thus shod and without any change, injury or permanent addition thereto, I apply my removable attachment which consists of a rigid frame 10 provided with calks 24 of any proper form, and means for easily and removably fastening the attachment to the hoof.

The frame 10 is a strong flat metal member of such size that its extremities will overlap the horseshoe to which it is to be applied, and is shaped in front and rear to form front and rear recesses 11 and 14 respectively. The front recess is of such size that the front calk 8 of the permanent horseshoe will be received therein and engaged at its opposite ends by the opposite sides 12 and 13 of the said front recess. While the rear recess 14 is of such size that the oppositely located rear calks 9 of the permanent horseshoe will be received therein and will be engaged by the opposite sides 15 and 16 of said rear recess.

For the sake of economy in material used and to render the attachment as light as possible consistent with strength and durability, I also prefer to recess the sides of the frame 10 so that in the preferred form and as illustrated in the drawing, the frame is in the shape of a cross having two front arms 17 and two rear arms 18. The ends of the arms 17 and 18 are turned up to form ears 19 extending upward past the permanent horseshoe and are then provided with means such as holes 20 near their ends for securing to said frame the lower ends of chains or straps 21 which extend upward upon the hoof and converge on account of the upper part of the hoof being much smaller than its lower part. The upper ends of these straps 21 are secured to a flexible member such as a chain or strap 22 encircling the upper part of the hoof and kept in place by its close fit thereto. A buckle or other adjustable and easily operated fastening means 23 is provided upon the flexible member 22. Near the extremities of the arms 17 and 18 there are provided downwardly projecting calks 24 of any character desired or proper to render the horse "sharp shod." Preferably these calks 24 will be separately removable or detachable from the calk frame 10 so that they may be sharpened or replaced when necessary as the frame will outwear many sets of calks.

The application and operation of my attachment will be as follows: An attachment of the proper size will be applied to the under side of the permanent horseshoe so that the front calk 8 will come between and be engaged by the front arms 17 while the rear calks 9 will come between and be engaged by the rear arms 18 of the frame. The ears 19 on the different arms will pass up closely adjacent to if not actually engaging the outer edge of the permanent horseshoe 7 and will thereby assist in keeping the calk frame 10 in proper position upon the horseshoe 7. The connections 21 will then be brought together about the hoof and the flexible member 22 adjusted as tightly as needed by buckle or other means 23. It will be noted that the only strain upon these straps or chains will be that of maintaining sufficient pressure to hold the frame 10 upward against the horseshoe. The working strains that come upon the frame are all in a substantially horizontal direction and will be transmitted from the frame direct to the horseshoe through the various contacts of the frame with the horseshoe calks and the frame arms 19 with the outer edge of the horseshoe and without bringing into use the straps 21 and 22.

The attachment is removed by undoing the fastening means 23 and moving the frame downwardly or having the horse lift its foot from the frame.

It will thus be seen that the attachment can be applied or removed quickly without the use of any tools and without changing, removing, or injuring the permanent horseshoe or the hoof; and on account of being so easily applied and removed they can be used much more advantageously than a device that needs considerable time and skill for its application.

While I prefer to have the contact between the arms of the frame and the permanent calks the main or even the only stress receiving contact, yet it will be noted that if such is not the case as through lack of perfect fit of the parts, yet the device is peculiarly adapted to adjust itself to satisfactory engagement so that the working strain will be transmitted directly to the permanent horseshoe and not through the straps, in that the two forms of direct strain-receiving contacts between the frame and horseshoe coöperate to obtain under widely varying circumstances a satisfactory direct contact. A satisfactory direct-strain-receiving engagement may yet be had when there is no contact for instance between the following parts, viz; the front calk 8 and one or both front arms 17; the rear calks 9 and one or both rear arms 18; any one, two, three or four of the frame arms and their adjacent permanent calks; any one, two, three or four of the ears 19 and its adjacent portion of the edge of the horseshoe; or one or two adjacent arms including their ears, and the adjacent permanent calks and shoe edges and many other combinations. It will thus be seen that these two coöperating ways of making contacts between the parts adapt the device to fit horseshoes of a great variety of sizes and modifications or variations. Again it will be noted that these advantages of construction and adjustment are obtained without weakening the device and without the presence of movable or separate or adjusting parts which are apt to break or bend under the strain of the hard usage that a calk frame receives upon a horse's hoof.

What I claim as new and desire to secure by Letters Patent is—

1. In combination with a permanent horseshoe having downwardly projecting front and rear calks, a detachable integrally-formed calk attachment consisting of a rigid cross-shaped frame fitting against the bottom of the horseshoe, the four arms of said cross extending beyond the said shoe and up-turned adjacent to the edge thereof, the front calk of said shoe being received between the front pair of arms and the rear shoe calks being received between the rear pair of said arms, the engagement of said up-turned ends of said arms against the shoe edge and of said shoe calks against said arms being adapted to hold said frame from horizontal movement, calks upon said arms adjacent to their outer extremities and flexible means engaging the upper slope of the hoof for detachably holding said cross-shaped frame between the calks of the shoe.

2. In combination with a permanent horseshoe having downwardly projecting front and rear calks, a detachable integrally-formed calk attachment consisting of a rigid cross-shaped frame fitting against the bottom of the horseshoe, the four arms of said cross extending beyond the said shoe and up-turned adjacent to the edge thereof, the front calk of said shoe being received between the front pair of arms and the rear shoe calks being received between the rear pair of said arms, the engagement of said up-turned ends of said arms against the shoe edge and of said shoe calks against said arms being adapted to hold said frame from horizontal movement, calks upon said arms adjacent to their outer extremities and flexible means connected to said up-turned ends of said arms and engaging the upper slope of the hoof for detachably holding said cross-shaped frame between the calks of the shoe.

3. In combination with a permanent horseshoe having downwardly projecting calks, a detachable integrally-formed calk attachment consisting of a rigid cross-shaped frame with its arms outwardly extending therefrom and up-turned adjacent to the outer edge of the shoe and recesses between said arms receiving said shoe calks, the inwardly engagement of said up-turned arms against the horseshoe edge and the outwardly engagement of said recesses against the shoe calks being adapted to hold said frame from horizontal movement, calks upon said frame and flexible means connected to said up-turned ends of said arms and engaging the upper slope of the hoof for detachably holding said cross-shaped frame between the calks of the shoe.

In witness whereof I have affixed my signature, in the presence of two witnesses, this 31st day of Jan., 1913.

JOHN R. WOOD.

Witnesses:
HARRIET WILLIAMS,
JAMES E. BREMER.

Copies of this patent may be obtained for five cents each, by addressing the "Commissioner of Patents, Washington, D. C."